United States Patent Office 3,057,888
Patented Oct. 9, 1962

3,057,888
PROCESSES FOR AND INTERMEDIATES IN THE MANUFACTURE OF UNSATURATED ALDEHYDES AND KETONES
Roman Marbet and Gabriel Saucy, both of Riehen, near Basel, Switzerland, assignors to Hoffmann-La Roche Inc., Nutley, N.J., a corporation of New Jersey
No Drawing. Filed Sept. 29, 1958, Ser. No. 763,800
Claims priority, application Switzerland Apr. 5, 1957
16 Claims. (Cl. 260—397.47)

This invention relates to novel processes of making organic compounds. More particularly, the invention is concerned, in one of its aspects, with a novel process for making α,β-unsaturated aldehydes; in another of its aspects, with a novel process for making unsaturated ketones; and in still another of its aspects with novel intermediates in such processes.

The novel process provided by the invention for making α,β-unsaturated aldehydes comprises contacting in an acidic medium an ester of a 1,1-disubstituted propargyl alcohol with a catalyst containing a metal compound selected from the group Ib of the periodic system and hydrolyzing the reaction product thus formed.

The reaction involved can be represented schematically by the following general equation:

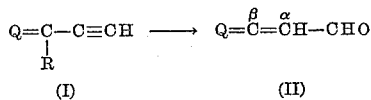

In the above equation, Formula I represents the ester starting material, and Formula II represents the α,β-unsaturated aldehyde product. The portion Q=C= of the formulae represents a divalent radical selected from the group consisting of hydrocarbon radicals, hydroxy-substituted hydrocarbon radicals, lower alkoxy-substituted hydrocarbon radicals, oxo-substituted hydrocarbon radicls, carboxy-substituted hydrocarbon radicals and lower carbalkoxy-substituted hydrocarbon radicals, both of the free valences in said radical being on a single carbon atom which is in turn attached to two other carbon atoms; and the portion —R of Formula I represents an esterified hydroxyl group, preferably an acyloxy radical having not more than seven carbon atoms, or the group formed by the reaction of the hydroxyl group with an inorganic acid, such as hydrochloric acid, sulfuric acid, phosphoric acid, or with a sulfonic acid, such as p-toluene-sulfonic acid.

It will thus be seen that, in a comprehensive embodiment, the invention provides a process of making an α,β-unsaturated aldehyde which comprises contacting an ester of a tertiary acetylenic carbinol, said ester being defined by the formula

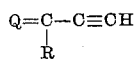

wherein the symbols Q=C= and —R have the same meaning indicated above, with a catalyst comprising essentially a metal compound selected from the group Ib of the periodic system in an acidic medium and hydrolyzing the reaction product thus formed.

It will be appreciated that the starting materials for the processes of the invention can be characterized generally as esters of 1,1-disubstituted-propargyl alcohols. Suitable starting materials include, for instance, carboxylic acid esters, such as the formates, acetates, propionates and similar lower alkanoates of, and the benzoates and toluates of, the following 1,1-disubstituted-propargyl alcohols:

3-methyl-butyn-(1)-ol-(3)
3-phenyl-butyn-(1)-ol-(3)
3-methyl-pentyn-(1)-ol-(3)
3-ethyl-pentyn-(1)-ol-(3)
3,7-dimethyl-octyn-(1)-ol-(3)
3,7-dimethyl-8-phenyl-octyn-(1)-ol-(3)
3,7,11-trimethyl-dodecyn-(1)-ol-(3)
3,7,11,15-tetramethyl-hexadecyn-(1)-ol-(3)
1-ethynyl-cyclopentanol-(1)
1-ethynyl-cyclohexanol-(1)
3-methyl-penten-(4)-yn-(1)-ol-(3)
3,7-dimethyl-octen-(6)-yn-(1)-ol-(3)
3,7-dimethyl-octen-(7)-yn-(1)-ol-(3)
3,6,7-trimethyl-octen-(6)-yn-(1)-ol-(3)
3,7,11,15-tetramethyl-hexadecatrien-(6,10,14) - yn - (1)-ol-(3)
1-ethynyl-cyclohexen-(4)-ol-(1)
5-[2,6,6-trimethyl-cyclohexen-(1)-yl]-3 - methyl - pentyn-(1)-ol-(3)
5-[2,6,6-trimethyl-cyclohexen-(2)-yl]-3 - methyl - pentyn-(1)-ol-(3)
3-methyl-3,4-dihydroxy-butyne-(1)
3-methyl-3-hydroxy-4-methoxy-butyne-(1)
3-methyl-5-carbethoxy-pentyn-(1)-ol-(3)
3,7-dimethyl-8-methoxy-octen-(7)-yn-(1)-ol-(3)
3,8-dimethyl-3,8-dihydroxy-decadien-(4,6)-diyne-(1,9)
1-ethynyl-4-hydroxy-cyclohexanol-(1)
3,7,11-trimethyl-dodecadien-(6,10)-yne-(1)-ol-(3)
5-[2,6,6-trimethyl-4-oxo-cyclohexen-(2) - yl] - 3 - methyl-pentyn-(1)-ol-(3)
5-[2,6,6-trimethyl-4-hydroxy-cyclohexen-(2)-yl]-3 - methyl-pentyn-(1)-ol-(3)
17-ethynyltestosterone
17-ethynyl-3,17-dihydroxy-androstene-(5)

1,1-disubstituted-propargyl alcohols of the type referred to above constitute a known general class, and esters thereof of the type referred to above also constitute a known general class. Accordingly, no novelty is claimed per se for the general class of starting materials used in the processes of this invention. Such starting materials can be prepared by known general processes, for example by condensation of acetylene with a ketone and esterification of the thus obtained tertiary acetylenic carbinols.

In the first step of the process provided by the invention, copper, silver and gold compounds may be used as the active part of the catalyst. If the reaction is to be performed in the presence of a copper salt as catalyst, copper metal may be added to the acidic medium, e.g. in finely divided form or, if desired, deposited upon a carrier material, the copper salt being formed in situ. According to another embodiment of the invention, the catalysts can be employed in the form of oxides, for example cupric oxide, if desired, in combination with another metal, e.g. copper-chromium oxide. Preferably, however, the catalysts used contain a salt, e.g. the acetate, carbonate, oxalate, nitrate and sulfate of copper or of silver, and the mixtures thereof.

Acidic media useful in the processes of the invention are organic acids and inorganic acids as well. The reaction is, however, preferably carried out in the presence of a lower carboxylic acid, such as propionic acid or butyric acid, particularly acetic acid, whereby the acidic medium may also serve as a solvent. If the reaction is carried out in the presence of strong acids, e.g. mineral acids, such as sulfuric acid or phosphoric acid, such acids are advantageously diluted with an inert solvent. Suitable solvents are, e.g. benzene, toluene, carbon tetrachloride, ethyl acetate or acetone.

The starting propynyl esters may be used in diluted form, as an emulsion or as a suspension. The treatment with the acidic medium can be conducted in liquid phase or in the vapor phase.

During the treatment with the catalyst and the acidic agent, there occurs an intramolecular rearrangement of the propynyl esters used as starting material which apparently leads to the formation of compounds, the structure of which probably corresponds to that of allene compounds of the following general formula:

$$Q=C=C=CH-R \quad (III)$$

wherein Q=C= and —R have the same meaning as indicated in Formula I above. If the first reaction step is carried out in the presence of a carboxylic acid, as a rule one mole of the acid reacts with the allene compound of Formula III to form an α,β-unsaturated diacyl compound of the following general formula:

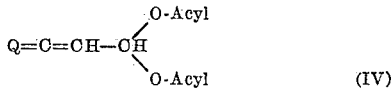

(IV)

wherein Q=C= has the same meaning as indicated in Formula I above. Depending on the prevailing reaction conditions and the tertiary acetylene carbinol used as starting material, the proportion of compounds of Formulas III and IV contained in the reaction mixture may vary.

If the treatment is carried out under especially strong reaction conditions, e.g. at high temperature or for a long time, a further rearrangement with shift of the double bond may lead to an enol ester. If 3,7-dimethyl-octen-(6)-yn-(1)-yl-(3) acetate is used as starting material, the treatment with acetic acid under such strong conditions leads partly to the enol ester of the following formula:

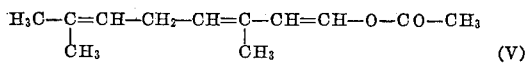

(V)

By means of analytic control, the reaction is conducted in such a way that there is obtained a mixture containing substantially only compounds of Formulas III and IV. For example by checking with silver nitrate it is possible to determine the point of the reaction at which the starting material has completely disappeared. The course of the reaction may also be followed by means of the infrared spectrum of the reaction mixture. The reaction is advantageously stopped as soon as there is no more starting material in the reaction mixture.

In a second step of the reaction, the mixture obtained is hydrolyzed. The hydrolysis may be carried out in alkaline medium or in acidic medium as well, the preferred method having to be chosen depending on the stability against the hydrolyzing agent of the aldehyde to be obtained. It is preferable to hydrolyze under mild conditions. Such mild hydrolyzing conditions may be, e.g. heating with sodium carbonate in aqueous alcohol, such as methanol: treating with alcoholic potassium hydroxide at low temperature; heating with dilute acetic acid; or treating with dilute sulfuric acid in acetone at room temperature.

If the acidic reaction medium used in the first reaction step contains water, more or less complete hydrolysis of the reaction products of Formulas III and IV occur immediately after these products have been formed. It is thus possible to obtain the α,β-unsaturated aldehydes in one operation.

According to an advantageous mode of performing the invention, the disubstituted propynyl acetate is heated in anhydrous acetic acid in the presence of silver carbonate, and the reaction product thus formed is isolated and hydrolyzed in a second reaction step by heating with sodium carbonate in aqueous methanol to form the free aldehyde.

Another preferred embodiment of the invention provides a process which comprises heating the disubstituted propynyl acetate in the presence of silver acetate in aqueous acetic acid, the aldehyde being formed by molecular rearrangement and hydrolysis in one operation.

The unsaturated aldehydes produced may be isolated from the reaction mixture according to methods known per se. For instance, they may be transformed into their bisulfite addition products.

One preferred embodiment of the invention provides a process which comprises heating a carboxylic acid ester of a 1,1-disubstituted propargyl alcohol, said ester being defined by the formula

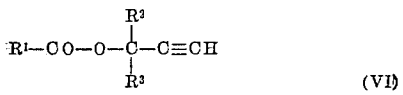

(VI)

wherein $R^1$—CO— represents an acyl radical selected from the group consisting of lower alkanoyl and benzoyl, $R^2$ represents a lower alkyl radical, and $R^3$ represents an alken-(3)-yl-(1) radical, in a liquid medium comprising essentially acetic acid, in the presence of a catalyst comprising essentially material selected from the group consisting of oxides, mineral acid salts and organic acid salts of copper and silver, and hydrolyzing the reaction product formed. This embodiment of the invention can be illustrated by the following general equation:

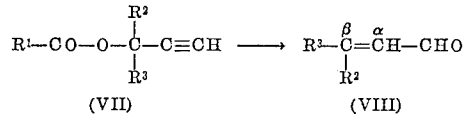

(VII)         (VIII)

In this embodiment of the invention, illustrative meanings of the acyl radical R—CO— include formyl, acetyl and benzoyl, but a preferred exemplification is acetyl. Illustrative meanings of the lower alkyl radical $R^2$ include methyl, ethyl and isobutyl; but a preferred exemplification is methyl. Illustrative meanings of the alken-(3)-yl-(1) radical $R^3$ include 4-methyl-penten-(3)-yl-(1), 3,4-dimethyl-penten-(3)-yl-(1), 1,4-dimethyl-penten-(3)-yl-(1), 4-methyl-hexen-(3)-yl-(1), 4,6-dimethyl-hepten-(3)-yl-(1), 4,8-dimethyl-nonadien-(3,7)-yl-(1) and 4,8,12-trimethyl-tridecatrien-(3,7,11)-yl-(1), 3-cyclohexyliden-propanyl-(1), 5-phenyl-penten-(3)-yl-(1); but a preferred exemplification is a lower alken-(3)-yl-(1) radical, and more particularly a monomethyl- or dimethyl-substituted penten-(3)-yl-(1) radical, especially 4-methyl-penten-(3)-yl-(1) and 3,4-dimethyl-penten-(3)-yl-(1). It will thus be apparent that, with respect to this embodiment of the invention, preferred starting materials are 3,7-dimethyl-octen-(6)-yn-(1)-yl-(3) acetate and 3,6,7-trimethyl-octen-(6)-yn-(1)-yl-(3) acetate. When starting from either of the foregoing esters, it is preferred to use glacial acetic acid solution as the acidic medium. It is also preferred to use a silver salt, e.g. the acetate, as the catalytic material; ordinarily it will be convenient to make this catalytic material in situ, by introducing freshly prepared silver carbonate into the acetic acid medium. The heating is preferably carried out at the reflux temperature of the reactant mixture. The hydrolysis is preferably effected by heating the reaction product with sodium carbonate in aqueous methanol. It is a particular merit of this embodiment of the invention that it can be applied to the preparation of α,β-unsaturated aldehydes directly from crude ester starting materials, without isolation or purification of the latter, but rather by reaction of the crude ester in the reaction mixture in which it is prepared.

Another preferred embodiment of the invention provides a process which comprises heating a lower alkanoic acid ester of a 1-ethynyl-1-cycloalkanol in a liquid medium comprising essentially acetic acid, in the presence of a catalyst comprising essentially material selected from the group consisting of oxides, mineral acid salts and organic acid salts of copper and silver and hydrolyzing the reaction product thus obtained. A specific exemplification of this preferred embodiment relates to a process which comprises refluxing a mixture comprising essentially 1-ethynyl-1-acetoxy-cyclohexane and acetic acid with silver nitrate, and hydrolyzing the reaction mixture by heating with soda in aqueous methanol thereby producing cyclohexylidene-acetaldehyde.

The invention also provides a novel process for making unsaturated ketones. Thus, if the hydrolysis referred to in the preceding paragraphs is carried out in alkaline medium and in the presence of a diluent, preferably a ketone, which is itself reactive with the α,β-unsaturated aldehyde formed, the latter immediately reacts with the diluent to form an unsaturated ketone. More particularly, it has been found that alicyclic unsaturated ketones of pseudoionone type can be made in this manner. For example, a preferred embodiment of this aspect of the invention provides a process of making unsaturated ketones which comprises treating an ester of the general formula

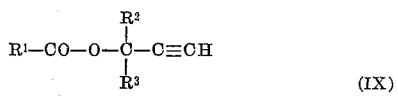
(IX)

wherein $R^1$, $R^2$ and $R^3$ have the same meaning as indicated in Formula VI above, with a catalyst containing a metal compound selected from the group Ib of the periodic system and hydrolyzing the reaction product thus formed in the presence of a lower aliphatic ketone in an alkaline medium.

Suitable starting materials for use in practising the last mentioned embodiment of the invention include, e.g. the esters of the following carbinols:

3,7-dimethyl-octen-(6)-yn-(1)-ol-(3),
3,6,7-trimethyl-octen-(6)-yn-(1)-ol-(3),
3,4,7-trimethyl-octen-(6)-yn-(1)-ol-(3),
3,7-dimethyl-nonen-(6)-yn-(1)-ol-(3),
3,7,9-trimethyl-decen-(6)-yn-(1)-ol-(3),
6-cyclohexyliden-3-methyl-hexyn-(1)-ol-(3),
8-phenyl-3,7-dimethyl-hepten-(6)-yn-(1)-ol-(3), and preferred lower aliphatic ketones include, e.g. actone, methylethyl ketone, diethyl ketone, hexen-(5)-one-(2) and the like.

The intermediate products formed by treating the starting disubstituted propargyl esters with an acidic agent in the presence of the mentioned catalysts, i.e. especially allene compounds of the formula

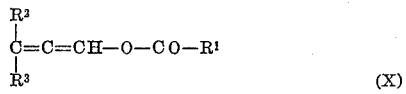
(X)

wherein $R^1$, $R^2$ and $R^3$ have the same meaning as indicated in Formula VI above, and α,β-unsaturated diacyl compounds of the formula

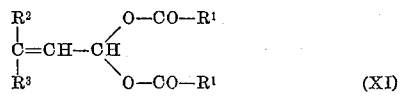
(XI)

wherein $R^1$, $R^2$ and $R^3$ have the same meaning as indicated in Formula VI above, constitute a new class of compounds.

The unsaturated aldehydes and ketones produced in accordance with the invention are useful in perfumery as odor-imparting agents, and in organic synthesis as intermediates in the preparation of perfume materials, of carotenoids, of lipo soluble vitamins and of steroids.

All temperatures in the following examples are indicated in degrees centigrade.

Example 1

25.2 g. of 3-methyl-3-acetoxy-butyne-(1) [obtained by reacting methyl-butynol with acetic acid anhydride and phosphoric acid; B.P. 78–79°/100 mm.; $n_D^{21}$=1.4178] were dissolved in 50 cc. of glacial acetic acid and, after addition of 0.2 g. of silver nitrate, heated for 30 minutes to 100°. The reaction mixture was poured onto ice, extracted with petroleum ether and washed 5 times with water. After drying with sodium sulfate and evaporating the solvent, there was obtained 25.6 g. of a reaction product having the following characteristics: $n_D^{22}$=1.4420; ultraviolet absorption maximum at 234 mμ, $E_1^1$=170 (in ethanol)

According to the infrared spectrum, this product contained no more starting material and consisted essentially of 3-methyl-1,1-diacetoxy-butene-(2) and of little 2-methyl-buten-(2)-al-(1). By distillation in high vacuo, there was obtained 17.4 g. of pure diacetate; B.P. 57°/0.03 mm.; $n_D^{22}$=1.4360; M.P. 19–20°. This substance showed no ultraviolet absorption maximum.

10 g. of this diacetate were dissolved in 100 cc. of acetone, added with 10 g. of 3 N sulfuric acid and allowed to stand for two hours at 20°. By extracting with ether, washing with saturated sodium chloride solution, drying with sodium sulfate, filtering and concentrating, there were obtained 4.5 g. of crude 2-methyl-buten-(2)-al-(1), which was purified by distillation; B.P. 130–131°/730 mm.; $n_D^{21}$=1.4521; ultraviolet absorption maximum at 271 mμ (in ethanol). The semicarbazone of this aldehyde melted at 210° and showed an ultraviolet absorption maximum at 271 mμ (in ethanol).

Example 2

50 g. of 1-ethynyl-1-acetoxy-cyclohexane in 500 cc. of aqueous acetic acid were mixed with 0.5 g. of silver nitrate and refluxed for 30 minutes under nitrogen. The reaction mixture was poured onto ice, extracted with petroleum ether (boiling range 40–60°, repeatedly washed with water, dried with sodium sulfate and evaporated in vacuo. The reaction product obtained showed an ultraviolet absorption maximum at 243 mμ, $E_1^1$=1540 (in ethanol)

By transforming this product into the crystalline bisulfite addition compound, the cyclohexylidene acetaldehyde was obtained; B.P. 85–90°/12 mm.; $n_D^{23}$=1.4835; ultraviolet absorption maximum at 240 mμ (in ethanol). The semicarbazone of this compound melted at 198–200° and showed an ultraviolet absorption maximum at 273 mμ (in ethanol).

By fractional distillation of the portion having not reacted with bisulfite, there was obtained pure 2-[cyclohexen-(1)-yl]-vinyl-(1)-acetate; B.P. 60–62°/0.04 mm.; $n_D^{23}$=1.5102; ultraviolet absorption maximum at 242 mμ (in ethanol).

In an analogous manner and starting from 1-ethynyl-1-acetoxy-cyclopentane ($n_D^{23}$=1.4559), there was obtained a reacttion product having an ultraviolet absorption maximum at 243 mμ, $E_1^1$=1125 (in ethanol)

$n_D^{22}$=1.5015. From the crystallised bisulfite addition product of this compound there was obtained cyclopentylidene acetaldehyde, which was transformed in a usual manner into the semicarbazone; M.P. 199–200°; ultraviolet absorption maximum at 272.5 mμ;

$E_1^1$=1647 (in ethanol)

Example 3

90 g. of 3,7-dimethyl-3-acetoxy-octen-(6)-yne-(1) [obtained by treating 3,7-dimethyl-octen-(6)-yn-(1)-ol-(3) with acetic acid anhydride and phosphoric acid] were mixed with 0.9 g. of silver carbonate and 300 cc. of glacial acetic acid, and stirred for one hour at 90°. Thereupon, the reaction mixture was poured onto 900 cc. of water in a separating vessel, and the oil which separated was extracted with petroleum ether. The petroleum ether solution was washed with saturated sodium hydrogen carbonate solution, dried with sodium sulfate and concentrated in vacuo at 40°. There were thus obtained 102 g. of a yellow oil which did not absorb in the ultraviolet spectrum and, according to the infrared spectrum, consisted of about 60% of 3,7-dimethyl-1-acetoxy-octatriene-(1,2,6), of 35% of 3,7-dimethyl-1,1-diacetoxy-octadiene-(2,6) and of 5% of unreacted starting material. This mixture showed at 20° a refraction index of about 1.469 and a density of about 0.967.

This mixture was taken up in 500 cc. of methanol, added with 60 g. of soda and 100 cc. of water, and refluxed for 30 minutes, while stirring. Thereupon, the mixture was poured onto 1500 cc. of water in a separating vessel and extracted with petroleum ether. The dried petroleum ether solution was evaporated, whereby crude citral was obtained as a brown-yellow oil; yield: about 70 grams; ultraviolet absorption maximum at 237–238 m$\mu$, $$E_1^1 = 800 \text{ (in ethanol)}$$

By purification over the bisulfite addition product, there was obtained therefrom 59 g. of pure citral; yield: about 84%.

Example 4

20 g. of 3,7-dimethyl-3-acetoxy-octen-(6)-yne-(1) were mixed with 100 cc. of 95% acetic acid and 0.2 g. of copper powder, whereupon the mixture was refluxed for one hour. From the reaction product there were obtained in the usual manner 16 g. of an oily product; $n_D^{20} = 1.4932$; ultraviolet absorption maximum at 237 m$\mu$. By purification over the crystalline bisulfite addition product, 8 g. of citral were obtained from this oil; yield about 50%.

Example 5

20 g. of 3,7-dimethyl-3-acetoxy-octen-(6)-yne-(1) were dissolved in 200 cc. of glacial acetic acid and 5 cc. of water and, after addition of 0.4 g. of gold chloride, refluxed for two hours under nitrogen. 18.4 g. of crude citral were obtained in the usual manner from the reaction product; $n_D^{20} = 1.4782$; ultraviolet absorption maximum at 235 m$\mu$;

$$E_1^1 = 270$$

By purification over the bisulfite addition product, pure citral was obtained therefrom.

In an analogous manner and by using 0.1 g. of copper oxide instead of gold chloride there were obtained 19.1 g. of crude citral; $n_D^{20} = 1.4981$; ultraviolet absorption maximum at 238 m$\mu$ (in ethanol). This product may be purified over the bisulfite addition product.

Example 6

10 g. of 3,7-dimethyl-3-acetoxy-octen-(6)-yne-(1) were dissolved in 100 cc. of propionic acid and 5 cc. of water and, after addition of 0.5 g. of copper-chromium oxide, the mixture was refluxed for 20 minutes. 9.8 g. of crude citral were obtained from the reaction product;

$$n_D^{22} = 1.4881$$

ultraviolet absorption maximum at 234 m$\mu$;

$$E_1^1 = 393 \text{ (in ethanol)}$$

This product may be purified by the bisulfite method.

Example 7

50 g. of 3,7-dimethyl-3-acetoxy-octen-(6)-yne-(1) were mixed with 0.5 g. of copper sulfate, 10 cc. of concentrated sulfuric acid and 500 cc. of benzene, and stirred for 15 minutes. The temperature of the mixture rose to 65° without external heating. After the usual treatment, the dark reaction product was isolated and hydrolyzed by boiling it for 30 minutes with soda in diluted methyl alcohol solution to form crude citral; ultraviolet absorption maximum at 236 m$\mu$. This product was purified over the bisulfite addition product; $n_D^{20} = 1.4855$; ultraviolet absorption maximum at 237–238 m$\mu$ (in ethanol).

Example 8

20 g. of 3,7-dimethyl-3-acetoxy-octen-(6)-yne-(1) were mixed with 80 cc. of ethyl acetate, 1 g. of copper acetate and 10 cc. of concentrated sulfuric acid, and heated to 70° while stirring. At this temperature, a sudden reaction occurred, and the reaction mixture was brought to boiling. Stirring was continued for 15 minutes without further heating and, after the usual treatment and hydrolysis according to Example 7, there was obtained crude citral as a dark oil; $n_D^{20} = 1.4884$. Pure citral may be obtained therefrom in a manner known per se over the bisulfite addition product.

Example 9

25 g. of 3,7-dimethyl-3-benzoxy-octen-(6)-yne-(1) [obtained by treating 3,7-dimethyl-3-hydroxy-octen-(6)-yne-(1) with benzoyl chloride in pyridine] were dissolved in 250 cc. of glacial acetic acid and, after addition of 12.5 cc. of water and 0.25 g. of copper powder, refluxed for 30 minutes under nitrogen. The reaction mixture was poured onto ice and extracted with petroleum ether; then, the extracts were washed with water, with dilute sodium hydroxide solution and again with water. After drying with sodium sulfate and distilling off the solvent in vacuo at 40°, there were obtained 14.1 g. of a crude product; $n_D^{22} = 1.4970$; ultraviolet absorption maximum at 236 m$\mu$ (in ethanol). 8.1 g. of pure citral were isolated therefrom according to the bisulfite method.

In an analogous manner and starting from 3,7-dimethyl-3-formoxy-octen-(6)-yne-(1) [obtained by treating 3,7-dimethyl-3-hydroxy-octen-(6)-yne-(1) with a mixture of formic acid and acetic anhydride], copper acetate being used as catalyst, there was obtained a reaction product having an ultraviolet absorption maximum at 235 m$\mu$ (in ethanol). Pure citral was obtained therefrom by purification according to the bisulfite method.

Example 10

148 g. of 3,6,7-trimethyl-octen-(6)-yn-(1)-ol-(3) were placed in a 1-liter flask and mixed with 1.7 g. of phosphoric acid in 114 g. of acetic acid anhydride, whereupon the mixture was stirred for 14 hours at 25–35°. Then, 277 cc. of 80% acetic acid, 4.45 g. of soda and 1.48 g. of silver carbonate were added and the mixture was refluxed for one hour, while stirring. The mixture was then poured onto ice and extracted with petroleum ether. The washed and dried petroleum ether solution was freed of the solvent, whereby 156 g. of $\epsilon$-methyl-citral was obtained as a residual brown oil; $n_D^{20} = 1.4850$–$1.4890$; ultraviolet absorption maximum at 235 m$\mu$, $$E_1^1 = \text{about } 620 \text{ (in ethanol)}$$

By purification according to the bisulfite addition product, there was obtained therefrom in a known manner 97 g. of pure $\epsilon$-methylcitral. Yield: 66%; ultraviolet absorption maximum at 236 m$\mu$, $$E_1^1 = \text{about } 820 \text{ (ethanol)}$$

In an analogous manner 3-methyl-7-phenyl-3-hydroxy-hepten-(6)-yne-(1) was transformed into 3-methyl-7-phenyl-3-acetoxyhepten-(6)-yne-(1) with acetic acid anhydride and phosphoric acid ($n_D^{24} = 1.5293$) and worked up to obtain 3 - methyl-7-phenyl-heptadien-(2,6)-al-(1); ultraviolet absorption maximum at 247 m$\mu$, $$E_1^1 = 698 \text{ (in ethanol)}$$

$n_D^{20} = 1.5599$.

Example 11

5 g. of 3,7,11-trimethyl-3-acetoxy-dodecyne-(1) [obtained by treating 3,7,11-trimethyl-3-hydroxy-dodecyne-(1) with acetic acid anhydride and phosphoric acid; B.P. 105°/0.05 mm.; $n_D^{24} = 1.4430$] were dissolved in 25 cc. of glacial acetic acid and, after addition of 0.1 g. of silver nitrate, heated for 30 minutes to 100° under nitrogen. Working up according to Example 9 gave 4.9 g. of a crude product; $n_D^{21} = 1.4599$; ultraviolet absorption maximum at 238 m$\mu$, $$E_1^1 = 366 \text{ (in ethanol)}$$

This product was mixed with 50 cc. of acetone and 5 cc. of 3 N sulfuric acid and allowed to sand for 20 hours at 20°. By extraction with petroleum ether, washing with water and eliminating the solvent, there were obtained 4.9 g. of crude 3,7,11-trimethyl-dodecyn-(2)-al-(1); $n_D^{21}=1.4678$; ultraviolet absorption maximum at 237 m$\mu$, $$E_1^1 = 553 \text{ (in ethanol)}$$

The substance, which was purified in the usual manner, boiled at 120°/12 mm. and gave an oily semicarbazone having an absorption maximum in the ultraviolet at 272 m$\mu$ (in ethanol). The free aldehyde has a strong and pleasant odor of fatty aldehydes.

In an analogous manner 3,7,11-trimethyl-3-acetoxy-dodecadien-(6.10)-yne-(1) was transformed into 3,7,11-trimethyl-dodecatrien-(2,6,10)-al-(1) (farnesal); ultraviolet absorption maximum at 237 m$\mu$, $$E_1^1 = 590 \text{ (in ethanol)}$$

$n_D^{20}=1.4977$.

Example 12

40 g. of 3,7,11,15 - tetramethyl-3-acetoxy-hexadecyne-(1) [dehydroisophytylacetate, obtained from dehydroisophytol with acetic acid anhydride and phosphoric acid; $n_D^{23}=1.4493$] were dissolved in 100 cc. of glacial acetic acid and, after addition of 0.4 g. of silver carbonate, heated for one hour at 90° under nitrogen. The reaction mixture was poured onto ice and extracted with petroleum ether; then, the extracts were washed 5 times with water. After drying with sodium sulfate and evaporating the solvent, there were obtained 38.3 g. of a reaction product having but a weak absorption in the ultraviolet at 238 m$\mu$; $n_D^{20}=1.4589$. 20 g. of the product thus obtained were dissolved in 100 cc. of methanol and, after addition of 10 g. of soda in 55 cc. of water, refluxed for one hour under nitrogen. By extracting with petroleum ether, washing with water, eliminating the solvent and drying with sodium sulfate, there were obtained 16.1 g. of crude 3,7,11,15 - tetramethyl - hexadecen-(2)-al-(1) (phytal); $n_D^{20}=1.4650$; ultraviolet absorption maximum at 238 m$\mu$, $$E_1^1 = 336 \text{ (in ethanol)}$$

By distillation in high vacuo, pure phytal was obtained therefrom as a colorless viscous oil melting at 157°/0.03 mm.

Example 13

10 g. of 3,7-dimethyl-3-acetoxy-8-methoxy-octen-(6)-yne-(1) [obtained by treating 3,7-dimethyl-3-hydroxy-8-methoxy-octen-(6)-yne-(1) with acetic acid anhydride and phosphoric acid; $n_D^{20}=1.4632$] were dissolved in 25 cc. of glacial acetic acid and, after addition of 0.1 g. of silver carbonate, heated for one hour at 90° under nitrogen. Working up according to the method described in Example 12 gave 9.3 g. of a reaction product having a weak absorption in the ultraviolet at 240 m$\mu$, $$E_1^1 = 50 \text{ (in ethanol)}$$

$n_D^{20}=1.4737$. The product thus obtained was dissolved in 50 cc. of methanol and, after addition of 5 g. of soda in 25 cc. of water, refluxed for 30 minutes under nitrogen. Working up according to the method described in Example 12 gave 6.6 g. of 3,7-dimethyl-8-methoxy-octadien-(2,6)-al-(1); $n_D^{20}=1.4865$; ultraviolet absorption maximum of 237 m$\mu$;

$$E_1^1 = 518 \text{ (in ethanol)}$$

Example 14

28 g. of cyclohexylester of 4-methyl-4-acetoxy-hexyne-(5) carboxylic acid [prepared by treating cyclohexylester of 4-methyl-4-hydroxy-hexyne-(5)-carboxylic acid with acetic acid anhydride and phosphoric acid] were mixed with 100 cc. of glacial acetic acid and 0.3 g. of silver carbonate, and heated for one hour at 90°. The reaction product obtained on working up according to Example 12 was mixed with 10 g. of sodium hydrogen carbonate, 200 cc. of methanol and 20 cc. of water, and heated for 3 hours. The product of the hydrolysis was worked up according to Example 12 and gave the cyclohexylester of 4-methyl-hexen-(4)-al-(6)-carboxylic acid as a colorless oil; B.P. 100–110°/0.05 mm.; $n_D^{22}=1.4710$; ultraviolet absorption maximum at 234 m$\mu$, $$E_1^1 = 380 \text{ (in ethanol)}$$

Example 15

19.4 g. of 3,7-dimethyl-3-acetoxy-octen-(6)-yne-(1) [prepared by treating 3,7-dimethyl-octen-(6)-yn-(1)-ol-(3) with acetic acid anhydride and phosphoric acid] were mixed with 48.5 cc. of glacial acetic acid and 0.28 g. of silver carbonate, and stirred for 2 hours at 80° under nitrogen. Thereupon, the reaction mixture was poured onto 200 cc. of ice-water and the oil that separated was quantitatively extracted with petroleum ether. The petroleum ether solution was washed with saturated sodium hydrogen carbonate solution, dried with anhydrous sodium sulfate and concentrated in vacuo at 40°. There were obtained 22.5 g. of a yellow oil having at 20° a refractive index of about 1.47 and which did not absorb in the ultraviolet. This oil was taken up in 225 cc. of acetone and, within 15 minutes, 5% aqueous potassium hydroxide solution was added thereto at 70° while vigorously stirring; the addition of the lye (about 200 cc.) was stopped when phenolphthalein kept a slight red coloration 5 minutes after the last input. Thereupon, 10% of the potassium lye employed was added (about 20 cc.) and the mixture was refluxed for 1 hour, while vigorously stirring. Then the solution was brought to pH 7 by addition of 1 cc. of glacial acetic acid, the acetone in excess was distilled off and the crude pseudoionone was extracted with petroleum ether. The petroleum ether solution was washed with saturated sodium hydrogen carbonate solution, then dried with sodium sulfate. After distilling off the petroleum ether, there were obtained 19.2 g. of a yellow-brown oil; $n_D^{20}=1.5240$; ultraviolet absorption maximum at 291 m$\mu$, $$E_1^1 = 1100 \text{ (in ethanol)}$$

By distillation and purification over the bisulfite addition compound (cf. Hibbert and Cannon, J. Amer., Chem. Soc. 46 [1924], 119, there was obtained pure pseudoionone as an almost colorless oil; $n_D^{20}=1.53$; density 0.896; ultraviolet absorption maximum at 291 m$\mu$, $$E_1^1 = 1300 \text{ (in ethanol)}$$

Example 16

16.4 g. of 3,7-dimethyl-octen-(6)-yn-(1)-ol-(3) were mixed with 0.16 g. of phosphoric acid in 12.9 g. of acetic acid anhydride, and stirred overnight at 25–35°. Then, 31.7 cc. of 80% acetic acid, 0.48 g. of soda and 0.16 g. of copper powder were added thereto. The mixture was refluxed for 1 hour and the reaction product was poured onto ice-water and extracted with petroleum ether according to Example 15. There were obtained 16.7 g. of a yellow-brown oil; $n_D^{20}=1.4840$–$1.4870$. This oil was taken up in 210 cc. of acetone, added with a solution of 2.8 g. of potassium hydroxide in 42 cc. of water and 4.2 cc. of ethanol, and stirred for 1½ hours at 40°. After working up according to Example 15, there were obtained 19 g. of a brown oil, which consisted, according to the ultraviolet absorption, of 48% pseudoionone. Pure pseudoionone can be obtained therefrom according to the working method disclosed in Example 15.

Example 17

330 g. of 3,7-dimethyl-3-acetoxy-octen-(6)-yne-(1) were mixed with 900 cc. of glacial acetic acid and 3 g. of silver carbonate, and stirred for 2 hours at 80°. The reaction product was mixed with 3000 cc. of ice-water and extracted with petroleum ether (boiling range 40–60°). The petroleum ether solution was washed with saturated sodium hydrogen carbonate solution and dried with sodium sulfate. Then, the mixture was concentrated to 1000 cc., cooled to −30 to −50°, whereupon a product crystallized on standing; it was sucked off while cold and washed with cold petroleum ether. By distillation in high vacuo and another recrystallization, there was obtained pure 3,7-dimethyl-1,1-diacetoxy-octadiene-(2,6), which melted at 4°; B.P. 87°/0.05 mm.; $n_D^{20}$=1.4588; density 0.999.

Treating this product with soda according to Example 3 gave a citral having an ultraviolet absorption maximum at 237 mμ, $E_1^1$=850

The hydrolytic treatment with potassium hydroxide solution in the presence of acetone according to Example 16 gave 90% pseudoionone; ultraviolet absorption maximum at 291 mμ, $E_1^1$=1170 (in ethanol)

From the mother liquors obtained when the diacetate had been separated, there was obtained, after distilling off the petroleum ether, an oil which gave a fraction distilling at 58–60°/0.05 mm. This purified oil contained one acetyl group per molecule and consisted, according to the infrared spectrum, of 3,7-dimethyl-1-acetoxy-octatrien-(1,2,6); $n_D^{20}$=1.4810; density 0.927. It had no absorption in the ultraviolet. On treating this product with soda according to Example 3, there was obtained citral having an ultraviolet absorption maximum at 237 mμ, $E_1^1$=780 (in ethanol)

On treating this product with potassium hydroxide solution in the presence of acetone according to Example 16, there was obtained pseudoionone having an ultraviolet absorption maximum at 291 mμ, $E_1^1$=1100 (in ethanol)

*Example 18*

10 g. of 3,7-dimethyl-3-acetoxy-octen-(6)-yne-(1) were mixed with 0.1 g. of copper sulfate, 2 cc. of concentrated sulfuric acid and 100 cc. of benzene, and stirred for 15 minutes, whereby the temperature rose to about 65°. After the usual working up, the dark reaction product was hydrolyzed according to Example 15 with potassium hydroxide solution in the presence of acetone, whereby crude pseudoionone was obtained; ultraviolet absorption maximum at 291 mμ (in ethanol).

*Example 19*

4.8 g. of 3,7-dimethyl-3-acetoxy-octen-(6)-yne-(1) were mixed with 20 cc. of glacial acetic acid and 0.05 g. of silver carbonate, and heated for ½ hour at 100°. The oily reaction product, which was isolated in the usual manner, was mixed with 50 cc. of methyl ethyl ketone, 50 cc. of methanol and a solution of 2.5 g. of potassium hydroxide in 5 cc. of water, and stirred for one hour at 80°. Isolation was performed according to Example 15 and there were obtained 4.6 g. of a brown oil, which consisted of about 78% of crude methyl-pseudoionone; $n_D^{20}$=1.522; ultraviolet absorption maximum at 292 mμ, $E_1^1$=970 (in ethanol)

*Example 20*

10 g. of the oil obtained according to Example 15 by treating 3,7-dimethyl-3-acetoxy-octen-(6)-yne-(1) with glacial acetic acid in the presence of silver nitrate were mixed with 60 g. of hexen-(5)-one-(2) and a solution of 5 g. of potassium hydroxide in 100 cc. of 95% methanol and heated for 1 hour at about 60°, under nitrogen. The reaction mixture was poured onto 200 cc. of ice-water and extracted with petroleum ether. The petroleum ether solution was thoroughly washed with water, dried with sodium sulfate and fractionated. At 110–115°, there were obtained 5.0 g. of 85–90% n-allyl-pseudoionone; ultraviolet absorption maximum at 292 mμ, $E_1^1$=900 (in ethanol)

*Example 21*

10 g. of the oil obtained according to Example 15 by treating 3,7-dimethyl-3-acetoxy-octen-(6)-yne-(1) with glacial acetic acid in the presence of silver acetate were reacted with 60 g. of diethyl ketone according to Example 20. By working up in an analogous manner, there was obtained n-methyl-iso-methylpseudoionone as a yellow oil; B.P. 115–120°/0.1 mm.; $n_D^{23}$=1.520; ultraviolet absorption maximum at 292 mμ, $E_1^1$=890 (in ethanol)

*Example 22*

208 g. 3,6,7 - trimethyl-3-acetoxy-octen-(6)-yne-(1) were mixed with 500 cc. of glacial acetic acid and 2 g. of silver oxide, and stirred for 6 hours at 70°. The reaction product was extracted according to Example 15, dissolved in 2000 cc. of methyl ethyl ketone, added with a solution of 100 g. of potassium hydroxide in 200 cc. of water and 2000 cc. of methanol, and stirred for 1 hour at 80°. Working up according to Example 15 gave 190 g. of a brown oil consisting of 77% of methylpseudoionone; $n_D^{20}$=1.5245; ultraviolet absorption maximum at 293 mμ, $E_1^1$=880 (in ethanol)

*Example 23*

10.4 g. of 2,6,6 - trimethyl-1-ethynyl-1-acetoxy-cyclohexane [obtained according to J. Chem. Soc. (1952), 1102], were mixed with 25 cc. of glacial acetic acid and 0.125 g. of silver carbonate, and heated for one hour at 90° under nitrogen. By working up according to example 13 there were obtained 10.1 g. of a pure reaction product, which consisted according to the infrared spectrum, substantially of 1-(2,6,6-trimethyl-cyclohexylidene)-vinylacetate-(2); $n_D^{23}$=1.4927. This product was boiled for ½ hour in a solution of 10 g. of sodium and hydrogen carbonate in 100 cc. of methanol. Working up as usual gave 8.2 g. of 2,6,6-trimethyl-cyclohexylidene-acetaldehyde; $n_D^{25}$=1.4996; ultraviolet absorption maximum at 238 mμ, $E_1^1$=780 (in petroleum ether)

The corresponding phenylsemicarbazone crystallized from ethanol as compact needles; M.P. 137–139°.

*Example 24*

0.3 g. of 3β,17β-diacetoxy-17α-ethynyl-androstene-(5) [obtained according to Helv. Chim. Acta 20 (1937), 1280], were mixed with 6 cc. of glacial acetic acid and 0.015 g. of silver carbonate, and heated for 20 minutes at about 95° under nitrogen. The mixture was extracted with ether, washed thrice with diluted caustic soda and thrice with water, and dried by means of sodium sulfate; the solvent was then evaporated in vacuo at 50°. 0.33 g. of an amorphous residue was dissolved in 5 cc. of acetone and, after 1 cc. of 3 N sulfuric acid had been added, allowed to stand for 5 hours at 27°. Working up in the usual manner gave a crude product, which was crystallized in petroleum ether. By recrystallization from ether-hexane, there was obtained pure 3β-acetoxy-pregnadien-(5; 17,20)-al-(21) as colorless needles; M.P. 168–170°; $[\alpha]_D^{24}$=−52.8° (c.=1 in chloroform); ultraviolet absorption maximum at 243 mμ (in alcoholic solution).

This application is a continuation-in-part of our copending application Serial No. 724,873, filed March 31, 1958, now abandoned.

We claim:

1. A process which comprises heating a 17-ethinyl-3, 17-lower alkanoic acid ester-androstene-(5) in a liquid medium comprising essentially acetic acid in the presence of a catalyst comprising essentially material selected from the group consisting of oxides, mineral acid salts and organic acid salts of group Ib metals of the periodic system, and hydrolyzing the reaction product.

2. A process which comprises refluxing a mixture comprising essentially 3,7-dimethyl-octen-(6)-yn-(1)-yl-(3) acetate and acetic acid with silver acetate, and hydrolyzing the reaction product thereby producing 3,7-dimethyl-octadien-(2,6)-al-(1).

3. A process of making an unsaturated ketone which comprises contacting a carboxylic acid ester of a tertiary acetylenic carbinol, said ester being defined by the formula

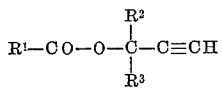

wherein R¹—CO— represents an acyl radical selected from the group consisting of lower alkanoyl and benzoyl, R² represents a lower alkyl radical, and R³ represents a monovalent hydrocarbon radical having its free valence at the 1-carbon atom and an olefinic bond between the 3-carbon atom and the 4-carbon atom, with a catalyst comprising essentially material selected from the group consisting of oxides, mineral acid salts and organic acid salts of group Ib metals of the periodic system in an acidic medium, and hydrolyzing the reaction product in an alkaline medium in the presence of a lower aliphatic ketone.

4. A process which comprises refluxing a mixture comprising essentially 3,7-dimethyl-octen-(6)-yn-(1)-yl-(3) acetate and acetic acid in the presence of a catalyst comprising essentially material selected from the group consisting of oxides, mineral acid salts and organic acid salts of group Ib metals of the periodic system, and hydrolyzing the reaction product in alkaline medium in the presence of acetone.

5. An allene compound having the formula

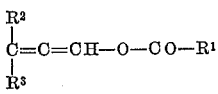

wherein R¹—CO— represents an acyl radical selected from the group consisting of lower alkanoyl and benzoyl, R² represents a lower alkyl radical, and R³ represents a monovalent hydrocarbon radical having its free valence at the 1-carbon atom and an olefinic bond between the 3-carbon atom and the 4-carbon atom.

6. 3,7-dimethyl-1-acetoxy-octatriene-(1,2,6).

7. A diacyl compound having the formula

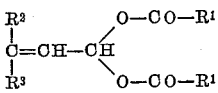

wherein R¹—CO— represents an acyl radical selected from the group consisting of lower alkanoyl and benzoyl, R² represents a lower alkyl radical, and R³ represents a monovalent hydrocarbon radical having its free valence at the 1-carbon atom and an olefinic bond between the 3-carbon atom and the 4-carbon atom.

8. A diacetyl compound having the formula

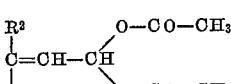

wherein R² represents a lower alkyl radical, and R³ represents a monovalent hydrocarbon radical having its free valence at the 1-carbon atom and an olefinic bond between the 3-carbon atom and the 4-carbon atom.

9. 3,7-dimethyl-1,1-diacetoxy-octadiene-(2,6).

10. A process which comprises hydrolyzing 3,7-dimethyl - 1 - acetoxy-octatriene-(1,2,6), thereby forming citral.

11. A process which comprises hydrolyzing 3,7-dimethyl - 1,1 - diacetoxy-octadiene-(2,6), thereby forming citral.

12. A process which comprises contacting in an acidic medium a carboxylic acid ester, having not more than seven carbon atoms in the acyl radical, of a 17-ethynyl-17-hydroxy-steroid with a catalyst comprising essentially material selected from the group consisting of oxides, mineral acid salts and organic acid salts of group Ib metals of the periodic system, and hydrolyzing the reaction product thus formed.

13. A process of making an α,β-unsaturated aldehyde which comprises contacting in an acidic medium a carboxylic acid ester, having not more than seven carbon atoms in the acyl radical, of a 1,1-disubstituted propargyl alcohol, wherein the 1,1-substituents are organic and are connected through carbon to the 1-carbon atom of the propargyl alcohol, in the presence of a catalyst comprising essentially material selected from the group consisting of oxides, mineral acid salts and organic acid salts of group Ib metals of the periodic system, and hydrolyzing the reaction product thus formed.

14. A process of making an α,β-unsaturated aldehyde which comprises contacting in an aqueous acidic medium a carboxylic acid ester, having not more than seven carbon atoms in the acyl radical, of a 1,1-disubstituted propargyl alcohol, wherein the 1,1-substituents are organic and are connected through carbon to the 1-carbon atom of the propargyl alcohol, in the presence of a catalyst comprising essentially a silver salt.

15. A process which comprises hydrolyzing an allene ester of the formula

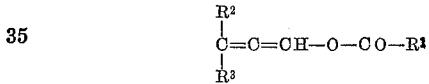

wherein R¹—CO— represents an acyl radical selected from the group consisting of lower alkanoyl and benzoyl, R² represents a lower alkyl radical, and R³ represents a monovalent hydrocarbon radical having its free valence at the 1-carbon atom and an olefinic bond between the 3-carbon atom and the 4-carbon atom.

16. A process which comprises hydrolyzing a 1,1-diester of the formula

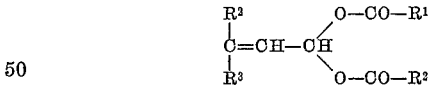

wherein R¹—CO— represents an acyl radical selected from the group consisting of lower alkanoyl and benzoyl, R² represents a lower alkyl radical, and R³ represents a monovalent hydrocarbon radical having its free valence at the 1-carbon atom and an olefinic bond between the 3-carbon atom and the 4-carbon atom.

References Cited in the file of this patent

UNITED STATES PATENTS

| | | |
|---|---|---|
| 2,552,227 | Smith et al. | May 8, 1951 |
| 2,766,289 | Lacey | Oct. 9, 1956 |
| 2,795,617 | Kimel et al. | June 11, 1957 |
| 2,801,266 | Shinz | July 30, 1957 |
| 2,806,874 | Surmatis | Sept. 17, 1957 |
| 2,827,482 | Isler et al. | Mar. 18, 1958 |
| 2,866,813 | McTeer | Dec. 30, 1958 |
| 2,902,515 | Montavon et al. | Sept. 1, 1959 |
| 2,904,594 | Huisman et al. | Sept. 15, 1959 |

FOREIGN PATENTS

| | | |
|---|---|---|
| 267,954 | Great Britain | June 9, 1927 |

OTHER REFERENCES

Riser: Chem. Abs. 48, 5792 (1954).